United States Patent [19]

Shimizu

[11] Patent Number: 5,058,103
[45] Date of Patent: Oct. 15, 1991

[54] BIDIRECTIONAL OPTICAL TRANSMISSION SYSTEM HAVING A LIGHT-INTERRUPTION DETECTING FUNCTION

[75] Inventor: Kazuyoshi Shimizu, Yokohama, Japan

[73] Assignee: Fujitsu Limited, Kawasaki, Japan

[21] Appl. No.: 433,120

[22] Filed: Nov. 8, 1989

[30] Foreign Application Priority Data

Nov. 8, 1988 [JP] Japan .................. 63-281586

[51] Int. Cl.$^5$ .................. H04J 1/00; H04B 10/00
[52] U.S. Cl. .................. 359/124; 359/152
[58] Field of Search .................. 370/3, 1, 24, 30; 455/601, 606, 610, 612, 617, 607; 340/555, 556, 557

[56] References Cited

U.S. PATENT DOCUMENTS

| | | | |
|---|---|---|---|
| 4,101,833 | 7/1978 | Bingham et al. | 370/30 |
| 4,393,518 | 7/1983 | Briley | 455/617 |
| 4,491,984 | 1/1985 | Wiedmer | 340/555 |
| 4,534,064 | 8/1955 | Giacometti et al. | 455/601 |
| 4,688,268 | 8/1987 | Holland | 455/608 |
| 4,833,668 | 5/1989 | Rowley et al. | 455/606 |
| 4,900,917 | 2/1990 | Dixon et al. | 455/601 |

FOREIGN PATENT DOCUMENTS

| | | |
|---|---|---|
| 53-110315 | 9/1978 | Japan . |
| 0100759 | 7/1980 | Japan .................. 455/601 |
| 55-136737 | 10/1980 | Japan . |
| 59-176937 | 10/1984 | Japan . |
| 60-144031 | 7/1985 | Japan . |
| 60-144032 | 7/1985 | Japan . |
| 61-58344 | 3/1986 | Japan . |
| 62-245827 | 10/1987 | Japan . |

Primary Examiner—Reinhard J. Eisenzopf
Assistant Examiner—Kinfe-Michael Negash
Attorney, Agent, or Firm—Staas & Halsey

[57] ABSTRACT

Disclosed is a bidirectional optical transmission system for effecting bidirectional optical transmission between offices by utilizing a common optical transmission line. Each office comprising: a light transmitting unit for transmitting a light signal to another office; a light receiving unit for receiving a signal from the other office; and a light passing unit for passing the transmission signal from the light transmitting unit to the optical transmission line and for passing the receiving signal from the optical transmission line to the light receiving unit. To discriminate whether the received signal is the signal from the other office or from the same office by crosstalk through the light passing unit, the light transmitting unit comprises a light-interruption detecting signal superimposing unit for superimposing a light-interruption detecting signal on the transmission signal, the frequencies of the light-interruption detecting signals from the first office and from the other office being different from each other; and the light receiving unit comprises a light-interruption detecting signal detecting unit for detecting the light-interruption detecting signal from the other office by identifying the frequency of the light-interruption detecting signal from the other office.

23 Claims, 6 Drawing Sheets

Fig. 4 261 and 262 (1st EXAMPLE)

261 and 262 (2nd EXAMPLE)

BIDIRECTIONAL OPTICAL TRANSMISSION SYSTEM HAVING A LIGHT-INTERRUPTION DETECTING FUNCTION

BACKGROUND OF THE INVENTION (1) Field of the Invention

The present invention relates to a bidirectional optical transmission system having a light-interruption detecting function.

In a bidirectional optical transmission system, it is required to be able to surely detect a light-interruption state of an optical signal at a receiving party, caused by a cutting or deterioration of an optical transmission line made of an optical fiber, or caused by a malfunction in a transmitting office.

(2) Description of the Related Art

Cross references relating to the present invention are as follows.

(a) Japanese Unexamined Patent Publication No. 59-17637 published on Oct. 6, 1984, which discloses modulating a supervising signal having a single frequency common to all repeaters and different from that of an information-containing light signal, transmitting the signal through a transmission line, receiving it at a terminal unit, separating the information light signal and the supervising light signal, and detecting a fault by monitoring the level of the supervising light signal.

(b) Japanese Unexamined Patent Publication No. 60-144031 published on Jul. 30, 1985, which discloses constant supervision of the characteristics of a transmitter in a bidirectional optical transmission system. At a receiver, a signal from the transmitter in the same office is fed back to the receiver part, and a signal transmitter through an optical fiber is simultaneously input into a light receiving element with the light signal configuration, and a converted electrical signal is separated. Thus, the light output signal from the transmitter part associated with the receiver is constantly supervised.

(c) Japanese Unexamined Patent Publication No. 60-144032 published on July 30, 1985, which discloses demodulation of high-speed pulses into a baseband signal by the use of a pulse modulating method, and passing the baseband signal through a switch, or directly passing the high speed pulse signal through a logical switch.

(d) Japanese Unexamined Patent Publication No. 53-110315 published on Sept. 27, 1979, which discloses a repeater including a supervising pilot signal oscillator.

(e) Japanese Unexamined Patent Publication No. 55-136737 published on Oct. 24, 1980, which discloses a single-frequency supervising pilot signal for supervising all repeaters.

(f) Japanese Unexamined Patent Publication No. 55-136737 published on Oct. 24, 1980, which discloses deteriorated LD information and other information related to the level of received light, which are converted into frequency information and sent to a supervising office for detection of a light repeater in which the LD is deteriorated.

(g) Japanese Unexamined Patent Publication No. 62-245827 published on Oct. 27, 1987, which discloses a fault supervising system in which when a fault occurs, the fault position and the fault contents are simultaneously informed to a terminal without taking the transmission line off line.

In an optical transmission, a bidirectional optical transmission system utilizing a wavelength division multiplexing module or a photo coupler has been considered and developed to attain effective utilization of optical fibers.

Such a wavelength-division multiplexing module or a photo coupler in one office is used to pass a signal transmitted from the one office through a common optical fiber to another office, and also to pass a signal received from the other office through the same common optical fiber to the first office. Thus, only a single optical fiber is used for the bidirectional optical transmission.

The wavelength-division multiplexing module or the photo coupler, however, has a crosstalk characteristic as later described in more detail. Due to the crosstalk in the wavelength-division multiplexing module or the photo coupler, even if a light interruption state occurs in the receiving office or on the optical fiber, it is conventionally difficult to determine whether the signal being received is from the other office or from the same office having leaked through the module or photo coupler into the received part from the transmitter.

None of the above described cross references disclose the problem of crosstalk in the wavelength-division multiplexing module or the photo coupler.

SUMMARY OF THE INVENTION

Accordingly, an object of the present invention is to enable sure detection of a light-interruption state of a receiving office even when the received signal includes crosstalk from the transmitting circuit in the transmitting office.

To attain the above object, there is provided, according to the present invention, a bidirectional optical transmission system having a light-interruption detecting function. The bidirectional optical transmission system effects bidirectional optical transmission between offices through an upward channel and a downward channel by utilizing a common optical transmission line. Each of the offices comprises: light transmitting means for generating a transmission signal having a high level and a low level to be transmitted from one office through the upward channel of the common optical transmission line to another office; light receiving means for receiving a signal from the other office through the downward channel to first office; and light passing means for passing the transmission signal from the light transmitting means to the upward channel and for passing the received signal from the downward channel to the light receiving means. The light transmitting means comprises light-interruption detecting signal superimposing means for superimposing a light-interruption detecting signal on the transmission signal. The frequencies of the light-interruption detecting signals from the transmitting office and from the receiving office are different from each other. The light receiving means comprises light-interruption detecting signal detecting means for detecting the light-interruption detecting signal from the other office by identifying the frequency of the light-interruption detecting signal from the other office.

According to one aspect of the present invention, the signal passing means is a light directional coupler.

According to another aspect of the present invention, the bidirectional optical transmission system is a wavelength multiplexing system and the signal passing means is a wavelength multiplexing module.

According to another aspect of the present invention, the light transmitting means comprises: light amplifying means for amplifying a signal to be transmitted; and light-interruption detecting signal generating means for generating the light-interruption detecting signal. The light-interruption detecting signal is superimposed, by the light-interruption detecting signal superimposing means, on the signal to be transmitted.

According to another aspect of the present invention, the light amplifying means comprises: signal amplifying means for amplifying a signal to be transmitted; light-interruption detecting signal amplifying means for amplifying the light-interruption detecting signal; signal synthesizing means for synthesizing the amplified signal and the amplified light-interruption detecting signal; and electrical-optical converting means for converting the synthesized signal into an optical signal. The optical signal is sent to the light passing means.

According to another aspect of the present invention, the light amplifying means further comprises clamping means for clamping the lowest level of the light-interruption detecting signal to the low level of the transmission signal.

According to another aspect of the present invention, the signal amplifying means is a first NPN transistor having its base connected to receive the signal to be transmitted; the light-interruption detecting signal amplifying means is a second NPN transistor having its base connected to receive the light-interruption detecting signal and having its emitter connected through an emitter bias resistor to the negative terminal of a power supply; the collectors of the first and second NPN transistors being commonly connected to the electrical-optical converting means.

According to another aspect of the present invention, the clamping means comprises a clamping diode having a cathode connected to the emitter of the second NPN transistor and having an anode connected to a point of a fixed potential, whereby when the potential at the emitter of the second NPN transistor becomes lower than a predetermined value, and the clamping diode is forward biased to raise the potential of the emitter of the second NPN transistor.

According to another aspect of the present invention, the clamping means further comprises an operational amplifier having a non-inverting input for applying a reference voltage, an inverting input connected through a first resistor to the anode of the clamping diode, and an output connected through a second resistor to the base of the second NPN transistor, the inverting input and the output of the operational amplifier being connected through a third resistor.

According to another aspect of the present invention, the electrical-optical converting means is a light emitting diode.

According to another aspect of the present invention, the electrical-optical converting means is a laser diode.

According to a second embodiment of the present invention, the light amplifying means comprises: signal synthesizing means for synthesizing the signal to be transmitted and the light-interruption detecting signal; signal amplifying means for amplifying the synthesized signal output from the signal synthesizing means; and electrical-optical converting means for converting the amplified synthesized signal into an optical signal; the optical signal being sent to the light passing means.

According to another aspect of the second embodiment of the present invention, the system further comprises clamping means for clamping the lowest level of the light-interruption detecting signal to the low level of the transmission signal.

According to another aspect of the second embodiment of the present invention, the signal amplifying means is an NPN transistor having its base connected to the output of the signal synthesizing means.

According to another aspect of the second embodiment of the present invention, the clamping means comprises a clamping diode having its cathode connected to the emitter of the NPN transistor and having its anode connected to a point of a fixed potential, whereby when the potential at the emitter of the NPN transistor becomes lower than a predetermined value, the clamping diode is forward biased to raise the potential of the emitter of the NPN transistor.

According to another aspect of the second embodiment of the present invention, the clamping means further comprises an operational amplifier having a non-inverting input for applying a reference voltage, an inverting input connected through a first resistor to the anode of the clamping diode, and an output connected through a second resistor to the base of the NPN transistor, the inverting input and the output of the operational amplifier being connected through a third resistor.

According to another aspect of the second embodiment of the present invention, the electrical-optical converting means is a light emitting diode.

According to another aspect of the second embodiment of the present invention, the electrical-optical converting means is a laser diode.

According to another aspect of the present invention, the light receiving means further comprises a light receiving circuit having a photo diode for converting an optical signal transmitted through the common optical transmission line into an electrical signal, an amplifier for amplifying the electrical signal output from the photo diode, and a discriminating circuit for discriminating the high level and the low level of the signal output from the amplifier.

According to still further aspect of the present invention, the light-interruption detection signal detecting means comprises: a band-pass filter for passing only a signal having the frequency of the light-interruption detecting signal from the other office; a preamplifier for amplifying the signal passed through the band-pass filter; and a discriminating circuit for discriminating whether or not the signal output from the preamplifier includes the light-interruption detecting signal from the other office.

According to another aspect of the present invention, the frequencies of the light-interruption detecting signals are higher than the frequency of the transmission signal.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

For better understanding of the present invention, a conventional bidirectional optical transmission system will first be described with reference to FIG. 1.

Figure 1:
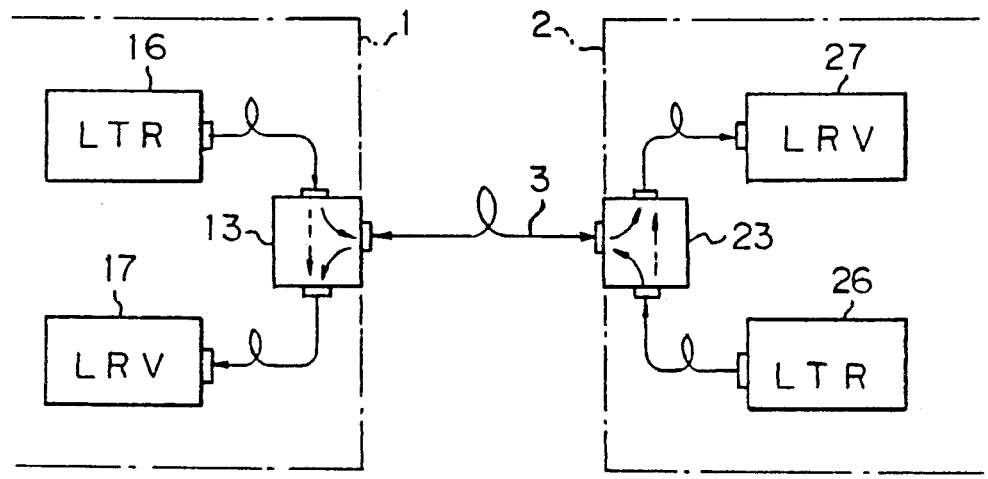
FIG. 1 is a block diagram showing an example of a conventional bidirectional optical data transmission system.

In FIG. 1, an office 1 and an office 2 are connected by an optical fiber 3. Through the optical fiber 3, an upward channel and a downward channel are established.

The office 1 includes a light transmitting part (LTR) 16, a light receiving part (LRV)17, a photo coupler or in other words an optical directional coupler 13, and the like. The photo coupler 13 passes the output signal from the light transmitting part 16 to the optical fiber 3, and also branches the optical signal received through the optical fiber 3 from the office 2 to the light receiving part 17.

The office 2 also includes a light transmitting part (LTR) 26, a light receiving part (LRV)27, an optical coupler 23 and the like having similar functions to those in the office 1.

When the bidirectional optical transmission system is a wavelength-division multiplexing system, multiwave-division multiplexing modules are used instead of the photo couplers 13 and 23.

In the optical data transmission system, the transmitted light output from the light transmitting part 16 in the office 1 is received through the photo coupler 13, the optical fiber 3, and the photo coupler 23 by the light receiving part 27 in the office 2. Similarly, the transmitted light output from the light transmitting part 26 in the office 2 is received through the photo coupler 23, the optical fiber 3, and the photo-coupler 13 by the light receiving part 17 in the office 1.

In such a bidirectional data transmission system, a light-interruption detecting circuit is required which can surely detect the generation of a fault when the optical signal from one office is interrupted due to a fault such as cutting or a deterioration of the optical fiber 3, or a malfunction of the transmitting part.

In a conventional light-interruption detecting circuit, the interrupted state of the signal at the receiving office is detected by the method of detecting a signal component in a digital signal, or by the method of detecting the amount of signal in a closed eye pattern In a circuit element such as a photo coupler or a wavelength-division multiplexing module used in a wavelength multiplexing system in a bidirectional optical data transmission system, crosstalk is often generated.

For example, as shown by a dotted line in the photo coupler shown in FIG. 1, the light output from the light transmitting part 16 leaks within the photo coupler 13 to the light receiving part 17 side, as well as being sent to the optical fiber 3.

On the other hand, in the case of a bidirectional transmission or wavelength-division multiplexing transmission, the signal configurations such as coding rules are often the same between the optical signal transmitted from the office 1 and the optical signal transmitted from the office 2. Therefore, it is difficult for the light receiving parts 17 and 27 to discriminate whether the received signal is from the other office through the optical fiber or from the same office having leaked in the photo coupler into the receiving part.

As a result, if there is crosstalk in the transmitting office, that crosstalk is detected as an optical signal even if the optical signal from the other office is interrupted so that the light-interruption state of the other office cannot be detected.

To clearly discriminate the crosstalk signal from the real receiving signal from the office 2, the level of the crosstalk signal should be lower than $-70$ dB when the power of the signal transmitted from the transmitting part 26 is $-3$ dB. However, the crosstalk signal passing through the photo coupler 13 is actually for example as large as $-30$ dB. Even when a wavelength-division multiplexing module is used, the level of the crosstalk signal is $-60$ dB which is too large for clearly discriminating the signal actually being received from the crosstalk signal.

As a countermeasure to this, it may be sufficient to use a photo coupler or a wavelength-division multiplexing module which is designed not to generate crosstalk. Such a photo coupler or a wavelength-division multiplexing module, however, is too expensive so that it is disadvantageous for realizing a low cost system. It may also be possible to intentionally deteriorate the minimum received light level in the light receiving part so as not to detect signal of the crosstalk level. This, however, results in the light receiving part not sufficiently using its performance capability.

Accordingly, an object of the present invention is to enable sure detection of the light-interruption state at a receiving office even when the signal being received includes crosstalk from the transmitting circuit in the same office.

An embodiment of the present invention will be described in the following.

Figure 2:
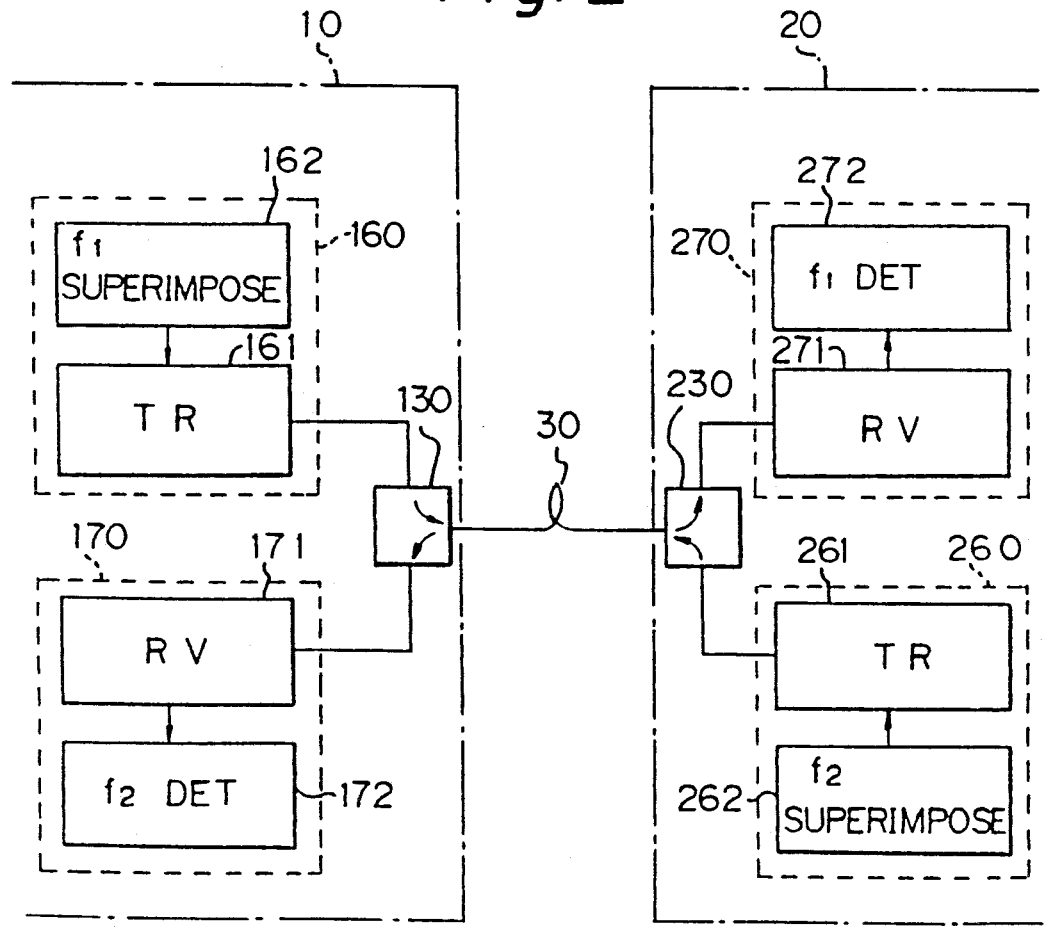
FIG. 2 is a principal block diagram showing a basic construction of a bidirectional optical data transmission system according to an embodiment of the present invention.

FIG. 2 is a principal block digram showing a bidirectional optical transmission system according to an embodiment of the present invention.

In FIG. 2, a bidirectional optical transmission system having a light-interruption detecting function is shown as a block diagram. The bidirectional optical transmission system effects bidirectional optical transmission between offices 10 and 20 through an upward channel and a downward channel by utilizing a common optical transmission line 30. The office 10 includes a light transmitting part 160, a light receiving part 170, and a light passing unit 130. The light transmitting part 160 generates a transmission signal having a high level and a low level to be transmitted from the transmitting office 10 through the light passing unit 130, and the upward channel of the common optical transmission line 30 to another office 20. The light receiving part 170 receives a receiving signal from the office 20 through the downward channel to the first office 10. The light passing unit 130 passes the transmission signal from the light transmitting circuit 160 to the upward channel, and also passes the receiving signal from the downward channel to the light receiving part 170.

The office 20 also includes a light transmitting part 260, a light receiving part 270, and a light passing unit 230 having functions similar to those in the office 10.

The light transmitting part 160 includes a transmitting circuit 161 and a light-interruption detecting signal superimposing circuit 162 for superimposing a light-interruption detecting signal on the transmission signal. The light transmitting part 260 also includes a transmitting circuit 261 and a light-interruption detecting signal superimposing circuit 262 for superimposing a light-interruption detecting signal on the transmission signal. The frequency of the light-interruption detecting signal output from the light-interruption detecting signal superimposing circuit 162 is different from the frequency of the light-interruption detecting signal output from the light-interruption detecting signal superimposing circuit 262. The light receiving part 170 includes a receiving circuit 171 and a light-interruption detecting signal detecting circuit 172. The light-interruption detecting signal detecting circuit 172 detects the light-interruption detecting signal from the office 20 by identifying the frequency of the light-interruption detecting signal output from the office 20.

Figure 3:
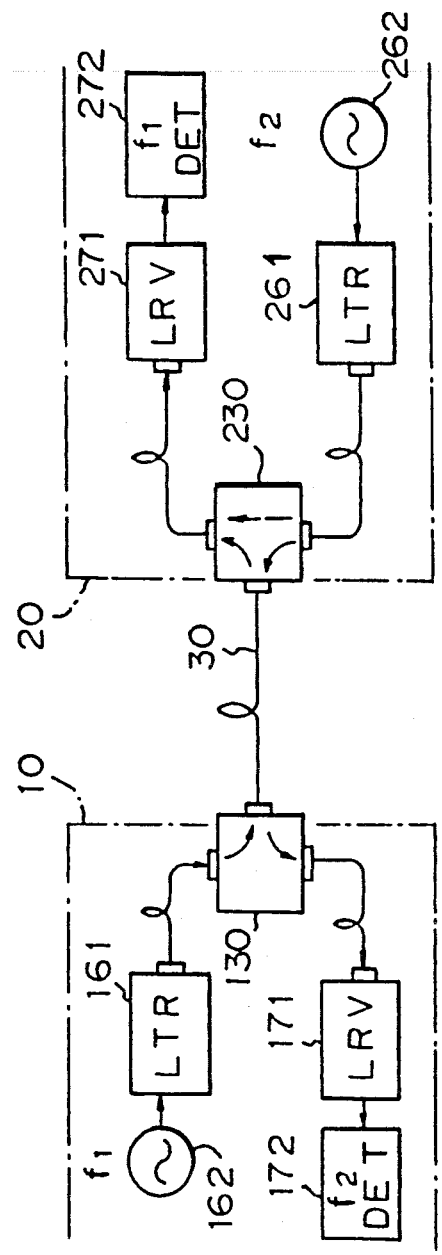
FIG. 3 is a block diagram showing a detailed construction of the bidirectional optical data transmission system according to an embodiment of the present invention.

FIG. 3 is a block diagram of a detailed example of the bidirectional optical transmission system shown in FIG. 2. In FIG. 3, the same reference numerals as those in FIG. 2 represent the same corresponding parts. As the common optical transmission line 30, an optical fiber is used.

The office 10 includes the light transmitting circuit 161, and a photo coupler issued as the light passing unit 130. The light-interruption detecting signal superimposing circuit 162 is a sine wave signal source in FIG. 3 for generating the light-interruption detecting signal having the frequency $f_1$ which is to be superimposed on the transmitted signal in the light transmitting circuit 161, and the light-interruption detecting signal detecting circuit 172 for detecting the light-interruption detecting signal having the frequency $f_2$ in the signal from the other office 20 and received by the light receiving circuit 171. The light-interruption detecting signal detecting circuit 172 can be constructed by a bandpass filter for passing the signal having the frequency $f_2$ and a detector for detecting the output signal from the bandpass filter.

Similarly, in the office 20, a photo coupler is used as the light passing unit 230, and a sine wave signal source is used as the light-interruption detecting signal superimposing circuit 262.

For example, when a transmission is effected from the transmitting circuit 161 to the receiving circuit 271, the light-interruption detecting signal having the frequency $f_1$ from the light-interruption detecting signal superimposing circuit 162 is superimposed on the transmitted signal by the transmitting circuit 161. At the receiving circuit 271 side, whether or not the light-interruption detecting signal $f_1$ is present is detected by the light-interruption detecting signal detecting circuit 272 to determine the light-interruption state of the transmission signal from the transmitting circuit 161. At this time, there is also a signal leaked from the transmitting circuit 261 to the receiving circuit 271. However, since the frequency of the light-interruption detecting signal superimposed on the signal is $f_2$, the detecting circuit 272 can discriminate this from the transmitted signal from the transmitting circuit 161. Accordingly, the detection of the light-interruption state on the side of the transmitting circuit 161 is not disturbed by the leakage signal.

Figure 4:
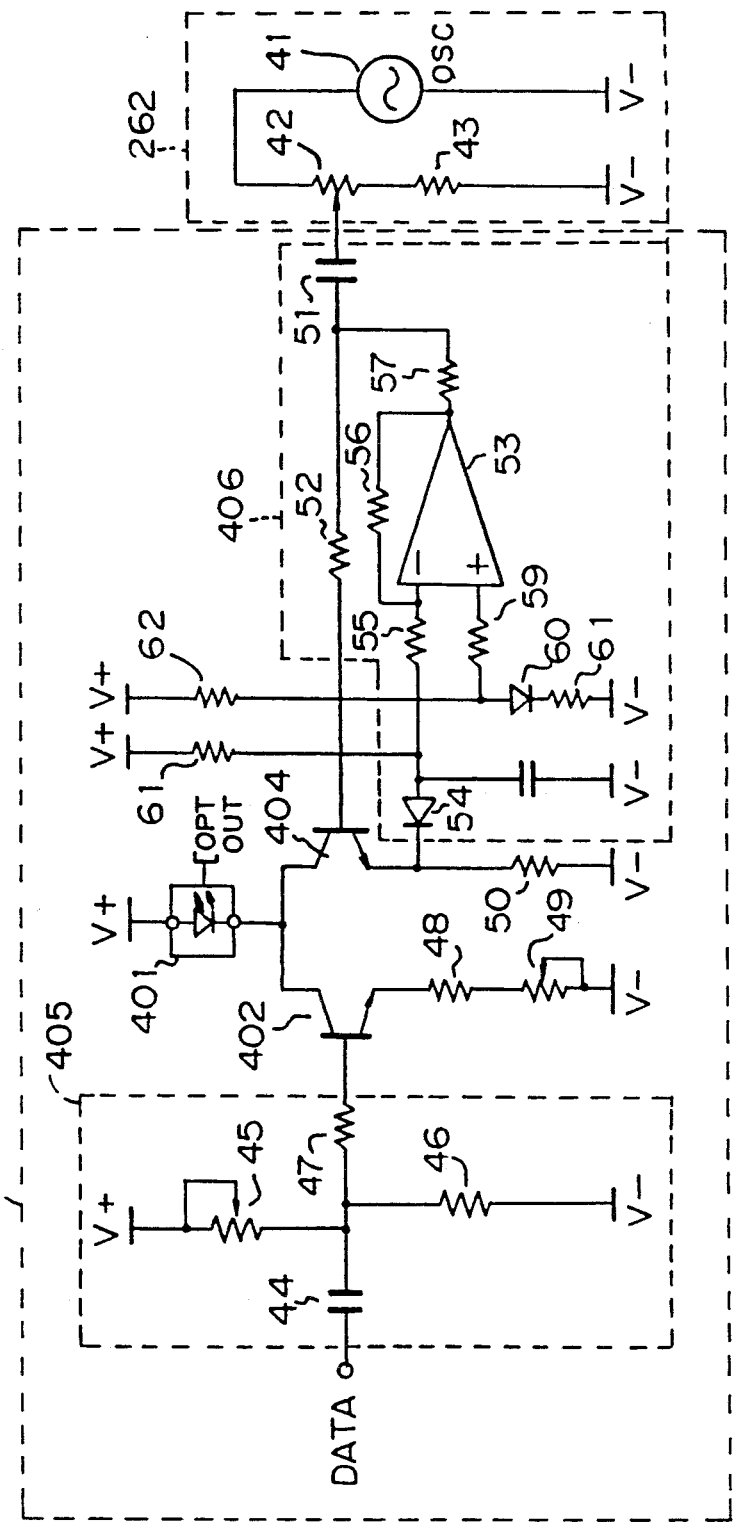
FIG. 4 is a circuit diagram showing an example of a light transmitting circuit and a light-interruption detecting signal generating circuit in a bidirectional optical transmitting system according to an embodiment of the present invention.

FIG. 4 is a circuit diagram showing an example of a detailed circuit construction of the light transmitting circuits 261 and the light-interruption detecting signal superimposing circuit 262. The light transmitting circuit 161 and the light-interruption detecting signal superimposing circuit 162 have the same constructions as the circuits 261 and 262 shown in FIG. 4. In FIG. 4, 401 is a light emitting element such as an LED or the like having relatively good linear current-light output characteristics, 402 and 404 are light emitting element driving transistors for supplying modulation current to the light emitting element 401, 405 is a transmitting data signal generating circuit, and 406 is a clamp circuit. The clamp circuit 406 makes the lowest potential of the sine wave signal from the sine wave signal source 262 equal to the lower level of the power supply so that the minimum value of the sine wave current flowing through the transistor 404 is made zero.

In more detail, the sine wave signal source 262 includes an oscillator 41, a variable resistor 42, and a resistor 43 connected in series. The variable resistor 42 is used to determine the amplitude of the frequency $f_2$.

The transmitting signal generating circuit 405 includes a coupling capacitor 44 for passing the alternating current component of the data to be transmitted, a level determining variable resistor 45 connected between the capacitor 44 and a positive terminal $V_+$ of a power source, and bias resistors 46 and 47 connected in series between a negative terminal $V_-$ of the power source.

Between the emitter of the transistor 402 and the negative terminal $V_-$, a bias resistor 48 and a variable resistor 49 are connected in series. The variable resistor 49 is used to determine the emitter current of the transistor 402 so as to adjust the output optical power. Between the emitter of the transistor 404 and the negative terminal $V_-$, a bias resistor 50 is connected.

The clamp circuit 406 includes a coupling capacitor 51 and a bias resistor 52 connected in series between the variable resistor 42 and the base of the transistor 404. The clamp circuit 406 further includes an operational amplifier 53, a diode 54 having a cathode connected to the emitter of the transistor 404 and an anode connected through a resistor 55 to an inverting input of the operational amplifier 53. Between the inverting input and the output of the operational amplifier 53, a feedback resistor 56 is connected. A resistor 57 is connected between the output of the operational amplifier 53 and the connecting point between the capacitor 51 and the resistor 52. Between a non-inverting input of the operational amplifier 53 and the negative terminal $V_-$ of the power source, a reference voltage determining circuit including a resistor 59, a diode 60 having an anode connected to the resistor 59, and a resistor 61 connected between the cathode of the diode 60 and the negative terminal $V_-$ of the power source. The anode of the diode 54 is connected through a resistor 61 to the positive terminal $V_+$ of the power source. The anode of the diode 60 is connected through a resistor 62 to the positive terminal $V_+$ of the power source. The potential at the anode of the diode 60 is fixed to a reference potential determined by the resistor 62, the forward voltage of the diode 60 and the resistor 61. Because of the imaginary short of the operational amplifier 53, the potential at the anode of the diode 54 is also fixed to a voltage level equal to the reference voltage.

The clamp circuit 406 functions to clamp the lowest level of the superimposed signal to the low level of the transmitted data signal.

In operation, when the potential at the emitter of the transistor 404 is lower than the reference voltage applied to the noninverting input of the operational amplifier 53, a current flows from the positive terminal $V_+$ through the resistor 61, the diode 54 and the resistor 54 to increase the emitter current so as to raise the potential at the emitter of the transistor. As a result, the lowest level of the superimposed signal appearing at the collector of the transistor 404 becomes higher than the reference voltage plus the collector-emitter voltage of the transistor 404.

Whereas, when the potential at the emitter of the transistor 404 is higher than the reference voltage applied to the noninverting input of the operational amplifier 53, the diode 54 is inversely biased so that it does not conduct.

In both cases, the operational amplifier 53 always amplifies the potential at the anode of the diode 54 by the resistance ratio of the resistors 55 and 56. The amplified voltage is applied through the resistors 57 and 52 to the base of the transistor 404. Thus, the direct current level of the voltage applied to the base of the transistor 404 is kept constant.

Since the collectors of the transistors 402 and 404 are commonly connected to the photo diode 401, the current passing through the photo diode 401 is the sum of the currents passing through the transistors 402 and 404. As a result, the sine-wave signal from the oscillator 41 is superimposed on the transmission signal (DATA).

Figure 5:
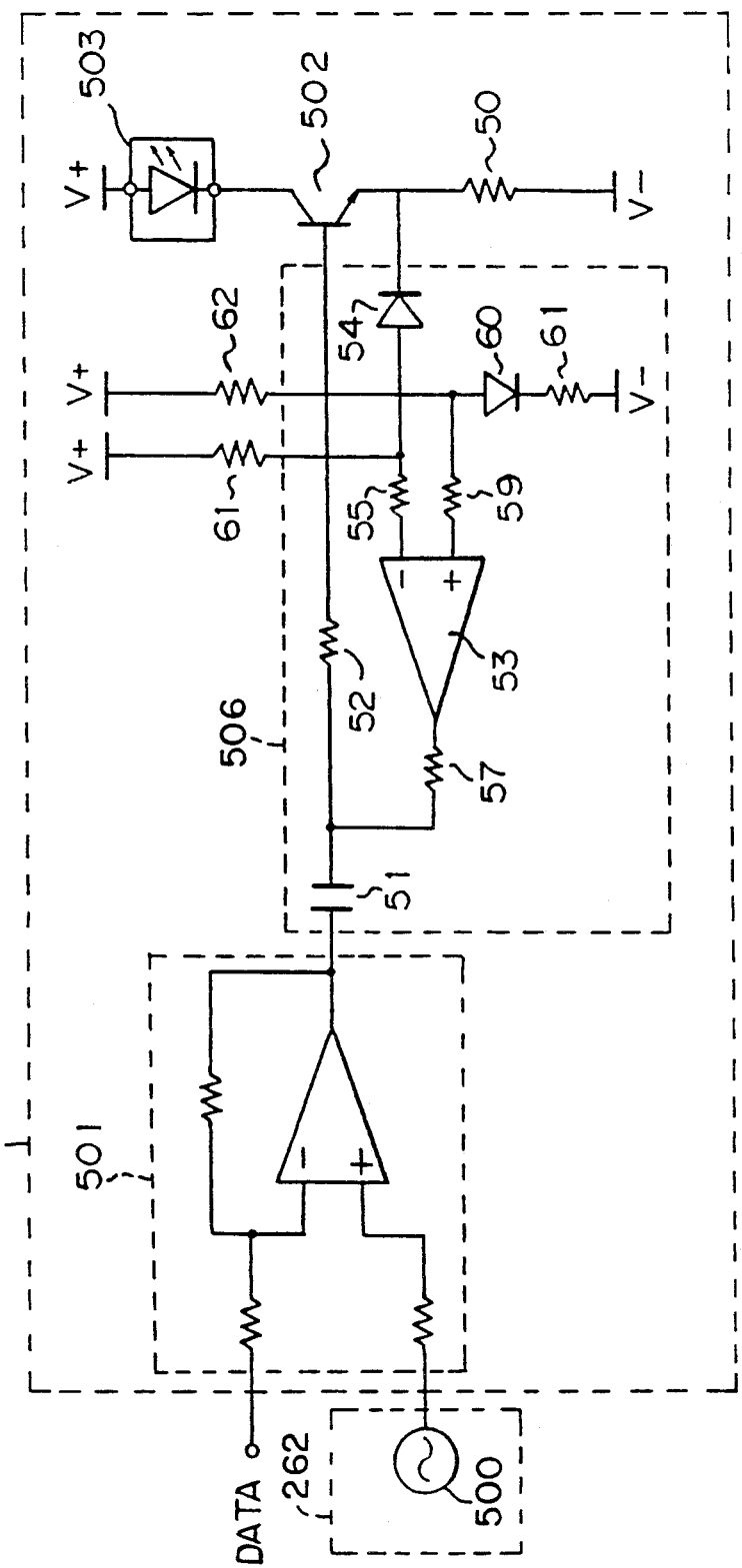
FIG. 5 is a circuit diagram showing another example of a light transmitting circuit and a light-interruption detecting signal generating circuit in a bidirectional optical transmitting system according to an embodiment of the present invention.

FIG. 5 is a circuit diagram showing another example of a detailed circuit construction of the light transmitting circuits 261 and the light-interruption detecting signal superimposing circuit 262. In FIG. 5, the transmission signal (DATA) and the light-interruption detecting signal generated by an oscillator 500 are at first synthesized by an amplifier 501 and then amplified by a transistor 502 so that the synthesized signal is output from a photo diode 503. Between the output of the amplifier 501 and the base of the transistor 502, a clamp circuit 506 is connected. The clamp circuit 506 has the same construction as the clamp circuit 406 shown in FIG. 4.

Figure 6:
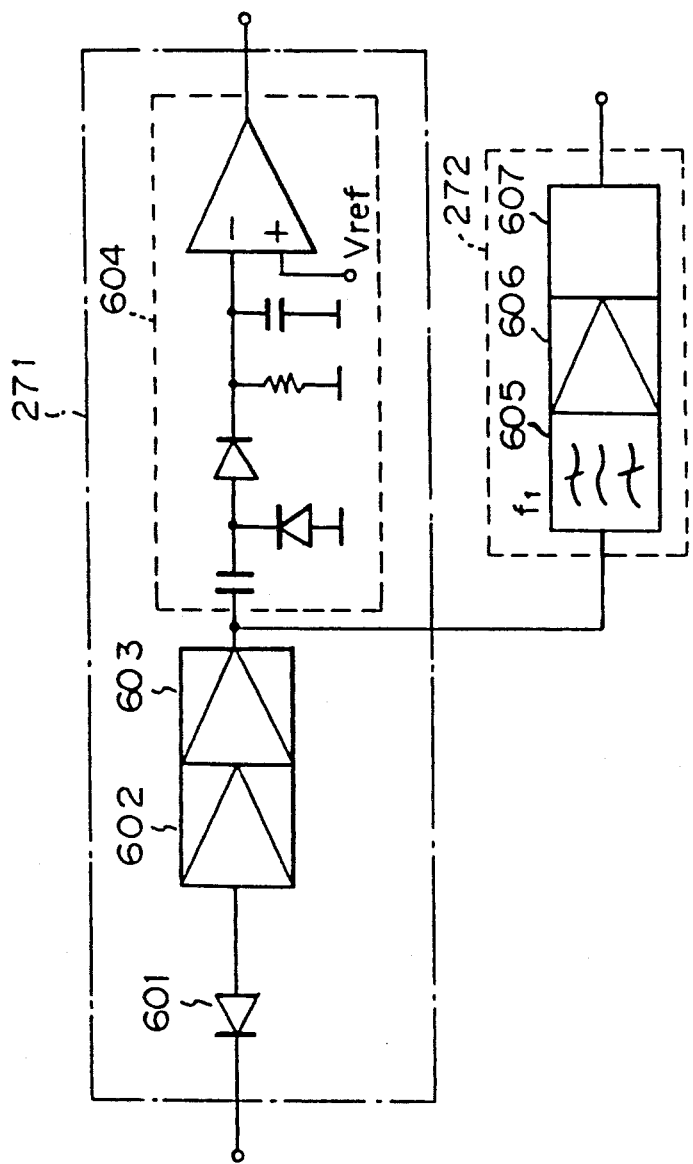
FIG. 6 is a block diagram showing an example of the light receiving circuit in FIG. 2.

FIG. 6 is a block diagram showing a detailed circuit construction of the light receiving circuit 271 and the light-interruption detecting signal detecting circuit 272. In FIG. 6, the light receiving circuit 271 includes a photo diode 601 for converting a light signal into an electrical signal, a preamplifier 602, a main amplifier 603, and a discriminating circuit 604 for discriminating the high level and the low level of the received signal. The circuit construction of the light receiving circuit 271 is the same as the conventional one. At the output of the main amplifier 603, the light-interruption detecting signal detecting circuit 272 is connected. The circuit 272 includes a band-pass filter 605 for passing only the signal having the frequency $f_1$, an amplifier 606, and a discriminating circuit 607 for discriminating whether or not the received signal includes the superimposed signal having the frequency $f_1$. The discriminating circuit 607 has the same construction as that of the discriminating circuit 604.

Figure 7:
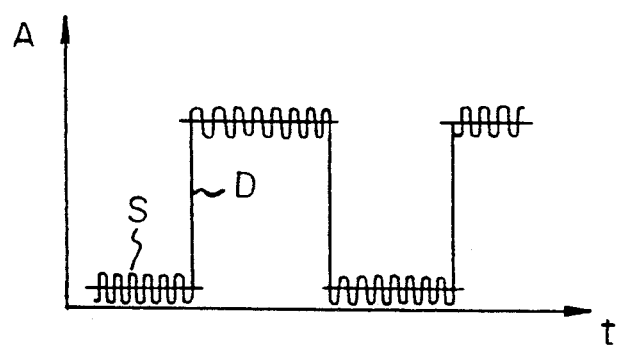
FIG. 7 is a waveform diagram showing an example of the output waveform from the light transmitting circuit.

FIG. 7 is a diagram showing an example of the light output waveform from the light transmitting circuit 161. As shown in the figure, the sine-wave signal S as the light-interruption detecting signal and having the frequency $f_1$ is superimposed on the digital data signal D from the transmitting data signal generating circuit 405 for example. The lowest level of the sine-wave signal S is made not to be lower than the low level of the digital data signal D by the function of the clamp circuit 406 or 506. Therefore, even the lowest level of the sine-wave signal is superimposed in its complete form without being sliced. Accordingly the signal level of the sine-wave signal is not changed at the low level or high level portion of the digital data signal. Thus, the extraction of the light-interruption detecting signal can be carried out stably.

Figure 8:
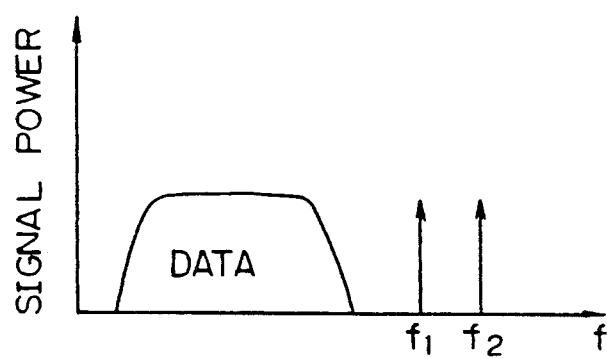
FIG. 8 is a frequency band diagram showing the frequencies of the signals to be superimposed on the transmitted signals.

FIG. 8 is a frequency band diagram showing an example of the frequencies $f_1$ and $f_2$ of the light-interruption detecting signals. As shown in FIG. 8, the frequencies $f_1$ and $f_2$ are selected to be out of the range of the digital data signal to be transmitted in order for easy discrimination of the frequencies $f_1$ and $f_2$. It is preferable to select the frequencies $f_1$ and $f_2$ to be higher than the frequency of the digital data signal.

The operation of the system shown in FIG. 3 is described in the following.

For example, at the light transmitting circuit 161, the sine-wave signal having the frequency $f_1$ as the light-interruption detecting signal from the sine-wave signal source 162 is superimposed on the transmitted signal, and the signal is then transmitted through the photo coupler 130, the optical fiber 30, and the photo coupler 230 to the light receiving circuit 271 in the office 20.

In the office 20, the light-interruption detecting signal detecting circuit 272 discriminates whether or not there is a light-interruption detecting signal $f_1$ in the signal received by the light receiving part 24. If the light-interruption detecting signal $f_1$ is not detected, the signal transmitted from the office 10 is determined to be in a light-interruption state.

On the other hand, in the office 20, a leakage signal is input from the light transmitting circuit 261 through the photo coupler 230 to the light receiving circuit 271 when the office 20 transmits a light signal to the office 10. However, since the light-interruption detecting signal superimposed on this leakage signal has the frequency $f_2$, the discrimination of whether or not the transmitted signal from the office 10 is interrupted is not disturbed by the leakage signal.

Various modifications are possible upon implementing the present invention. For example, in the above embodiment, an optical directional coupler is employed to realize the bidirectional optical transmission, however, the present invention is not limited to this but a wavelength multiplexing module may be employed instead of the optical directional coupler when the bidirectional optical transmission is realized by a wave-division multiplexing system. Also, it is apparent that the construction of the light transmitting circuit is not restricted to the one shown in FIG. 4 or 5 but, for example, a laser diode may be employed as a light emitting element in place of the light emitting diode (LED).

According to the present invention, even when crosstalk leaked from the transmitting circuit of the transmitting office is present in the received signal, the light-interruption state in the optical fiber or in the other office can be surely detected.

I claim:

1. A bidirectional optical transmission system having a light-interruption detecting function, said bidirectional optical transmission system effecting bidirectional optical transmission between offices through an upward channel and a downward channel by utilizing a common optical transmission line, each of said offices comprising:

light transmitting means for generating a transmission signal having a high level and a low level to be transmitted from a first office through said upward channel of said common optical transmission line to another office;

light receiving means for receiving at said first office a receiving signal from said other office through said downward channel of said common optical transmission line; and light passing means for passing said transmission signal from said light transmitting means to said upward channel and for passing said receiving signal from said downward channel to said light receiving means;

said light transmitting means comprising light-interruption detecting signal generating means for generating a light-interruption detecting signal, the frequencies of the light-interruption detecting signals from said first office and from said other office being different from each other, said light-interruption detecting signal and said transmission signal being superimposed by a direct modification of said transmission signal; and said light receiving means comprising light interruption detecting signal detecting means for detecting said light-interruption detecting signal from said other office by identifying said frequency of the light-interruption detecting signal from said other office.

2. A bidirectional optical transmission system having light-interruption detecting function as claimed in claim 1, wherein said signal passing means is a light directional coupler.

3. A bidirectional optical transmission system having light-interruption detecting function as claimed in claim 1, wherein said bidirectional optical transmission system is a wavelength multiplexing system and said signal passing means is a wavelength multiplexing module.

4. A bidirectional optical transmission system having a light-interruption detecting function as claimed in claim 1, wherein said light transmitting means comprising:

light-interruption detecting signal generating means for generating said light-interruption detecting signal;

superimposing means for superimposing said light-interruption detecting signal and a signal to be transmitted; and electrical-optical converting means for converting the superimposed signal into an optical signal.

5. A bidirectional optical transmission system having a light-interruption detecting function as claimed in claim 4, wherein said superimposing means comprises:

signal amplifying means for amplifying a signal to be transmitted;

light-interruption detecting signal amplifying means for amplifying said light-interruption detecting signal;

signal synthesizing means for synthesizing the amplified signal and the amplified light interruption detecting signal; and electrical-optical converting means for converting the synthesized signal into an optical signal;

said optical signal being sent to said light passing means.

6. A bidirectional optical transmission system having a light-interruption detecting function as claimed in claim 5, wherein said superimposing means further comprises clamping means for clamping the lowest level of said light-interruption detecting signal to the low level of said transmission signal.

7. A bidirectional optical transmission system having a light-interruption detecting function as claimed in claim 6, wherein said signal amplifying means is a first NPN transistor having its base connected to receive said signal to be transmitted;

said light-interruption detecting signal amplifying means is a second NPN transistor having its base connected to receive said light-interruption detecting signal and having its emitter connected through an emitter bias resistor to a negative terminal of a power supply;

the collectors of said first and second NPN transistors being commonly connected to said electrical-optical converting means.

8. A bidirectional optical transmission system having a light-interruption detecting function as claimed in claim 7, wherein said clamping means comprises a clamping diode having its cathode connected to the emitter of said second NPN transistor and having its anode connected to a point of a fixed potential, whereby when the potential at the emitter of said second NPN transistor becomes lower than a predetermined value, said clamping diode is forward biased to raise the potential of the emitter of said second NPN transistor.

9. A bidirectional optical transmission system having a light-interruption detecting function as claimed in claim 8, wherein said clamping means further comprises an operational amplifier having a non-inverting input for applying a reference voltage, an inverting input connected through a first resistor to said anode of said clamping diode, and an output connected through a second resistor to the base of said second NPN transistor, the inverting input and the output of said operational amplifier being connected through a third resistor.

10. A bidirectional optical transmission system having a light-interruption detecting function as claimed in claim 9, wherein said electrical-optical converting means is a light emitting diode.

11. A bidirectional optical transmission system having a light-interruption detecting function as claimed in claim 9, wherein said electrical-optical converting means is a laser diode.

12. A bidirectional optical transmission system having a light-interruption detecting function as claimed in claim 4, wherein said superimposing means comprises:

signal synthesizing means for synthesizing said signal to be transmitted and said light-interruption detecting signal;

signal amplifying means for amplifying the synthesized signal output from said signal synthesizing means; and electrical-optical converting means for converting the amplified synthesized signal into an optical signal;

said optical signal being sent to said light passing means.

13. A bidirectional optical transmission system having a light-interruption detecting function as claimed in claim 12, further comprising a clamping means for clamping the lowest level of said light-interruption detecting signal to the low level of said transmission signal.

14. A bidirectional optical transmission system having a light-interruption detecting function as claimed in claim 13, wherein said signal amplifying means is an NPN transistor having its base connected to the output of said signal synthesizing means.

15. A bidirectional optical transmission system having a light-interruption detecting function as claimed in claim 14, wherein said clamping means comprises a clamping diode having its cathode connected to the emitter of said NPN transistor and having its anode connected to a point of a fixed potential, whereby when the potential at the emitter of said NPN transistor becomes lower than a predetermined value, said clamping diode is forward biased to raise the potential of the emitter of said NPN transistor.

16. A bidirectional optical transmission system having a light-interruption detecting function as claimed in claim 15, wherein said clamping means further comprises an operational amplifier having a non-inverting input for applying a reference voltage, an inverting input connected through a first resistor to said anode of said clamping diode, and an output connected through a second resistor to the base of said NPN transistor, the inverting input and the output of said operational amplifier being connected through a third resistor.

17. A bidirectional optical transmission system having a light-interruption detecting function as claimed in claim 16, wherein said electrical-optical converting means is a light emitting diode.

18. A bidirectional optical transmission system having a light-interruption detecting function as claimed in claim 16, wherein said electrical-optical converting means is a laser diode.

19. A bidirectional optical transmission system having a light-interruption detecting function as claimed in claim 1, wherein said light receiving means further comprising light receiving circuit having a photo diode for converting an optical signal transmitted through said common optical transmission line into an electric signal, an amplifier for amplifying said electrical signal output from said photo diode, and a discriminating circuit for discriminating the high level and the low level of the signal output from said amplifier.

20. A bidirectional optical transmission system having a light-interruption detecting function as claimed in claim 19, wherein said light-interruption detection signal detecting means comprises:

a band-pass filter for passing only the signal having the frequency of said light-interruption detecting signal from said another office;

a preamplifier for amplifying the signal passed through said band-pass filter; and a discriminating circuit for discriminating whether or not the signal output from said preamplifier includes said light-interruption detecting signal from said other office.

21. A bidirectional optical transmission system having a light-interruption detecting function as claimed in claim 1, wherein said frequencies of said light-interruption detecting signals are higher than the frequency of said transmission signal.

22. A bidirectional optical transmission system having a light-interruption detecting function, said bidirectional optical transmission system effecting bidirectional optical transmission between offices through an upward channel and a downward channel by utilizing a common optical transmission line, each of said offices comprising:

light transmitting means for generating a transmission signal having a high level and a low level to be transmitted from a first office through said upward channel of said common optical transmission line to another office;

light receiving means for receiving at said first office a receiving signal from said other office through said downward channel at said common optical transmission line; and light passing means for passing said transmission signal from said light transmitting means to said upward channel and for passing said receiving signal from said downward channel to said light receiving means;

said light transmitting means comprising light-interruption detecting signal generating means for generating a light-interruption detecting signal, the frequencies of the light-interruption detecting signals from said first office and from said other office being different from each other, said light-interruption detecting signal and said transmission signal being superimposed by a direct modification of said transmission signal; and said light receiving means comprising light interruption detecting signal detecting means for detecting said light-interruption signal from said other office by identifying said frequency of the light-interruption detecting signal from said other office;

wherein said light transmitting means includes:

light-interruption detecting signal generating means for generating said light-interruption detection signal, superimposing means for superimposing said light-interruption detecting signal and a signal to be transmitted, and electrical-optical converting means for converting the superimposed signal into an optical signal, wherein said superimposing means includes:

signal amplifying means for amplifying a signal to be transmitted, light-interruption detecting signal amplifying means for amplifying said light-interruption detecting signal, signal synthesizing means for synthesizing the amplified signal and the amplified light-interruption detecting signal, and electrical-optical converting means for converting the synthesized signal into an optical signal, wherein said optical signal is sent to said light passing means, wherein said superimposing means further comprises clamping means for clamping the lowest level of said light-interruption detecting signal to the low level of said transmission signal, wherein said signal amplifying means is a first NPN transistor having its base connected to receive said signal to be transmitted, wherein said light-interruption detecting signal amplifying means is a second NPN transistor having its base connected to receive said light-interruption detecting signal and having its emitter connected through an emitter bias resistor to a negative terminal of a power supply, and wherein the collectors of said first and second NPN transistors are commonly connected to said electrical-optical converting means.

23. A bidirectional optical transmission system having a light-interruption detecting function, said bidirectional optical transmission system effecting bidirectional optical transmission between offices through an upward channel and a downward channel by utilizing a common optical transmission line, each of said offices comprising:

light transmitting means for generating a transmission signal having a high level and a low level to be transmitted from a first office through said upward channel of said common optical transmission line to another office;

light receiving means for receiving at said first office a receiving signal from said other office through said downward channel at said common optical transmission line; and light passing means for passing said transmission signal from said light transmitting means to said upward channel and for passing said receiving signal from said downward channel to said light receiving means;

said light transmitting means comprising light-interruption detecting signal generating means for generating a light-interruption detecting signal on said transmission signal, the frequencies of the light-interruption detecting signals from said first office and from said other office being different from each other, said light-interruption detecting signal and said transmission signal being superimposed by a direct modification of said transmission signal; and said light receiving means comprising light interruption detecting signal detecting means for detecting said light-interruption detecting signal from said other office by identifying said frequency of the light-interruption detecting signal from said other office;

wherein said light transmitting means includes:

light-interruption detecting signal generating means for generating said light-interruption detecting signal, superimposing means for superimposing said light-interruption detecting signal and a signal to be transmitted, and electrical-optical converting means for converting the superimposed signal into an optical signal, wherein said superimposing means includes:

signal synthesizing means for synthesizing said signal to be transmitted and said light-interruption detecting signal, signal amplifying means for amplifying the synthesized signal output from said signal synthesizing means, and electrical-optical converting means for converting the amplified synthesized signal into an optical signal, wherein said optical signal is sent to said light passing means, further comprising:

a clamping means for clamping the lowest level of said light-interruption detecting signal to the low level of said transmission signal, and wherein said signal amplifying means is an NPN transistor having its base connected to the output of said signal synthesizing means.

* * * * *